US006997127B2

(12) United States Patent
Guy et al.

(10) Patent No.: US 6,997,127 B2
(45) Date of Patent: Feb. 14, 2006

(54) METHOD OF UPHOLSTERING AN AUTOMOTIVE SEAT

(75) Inventors: Ron Guy, Taylor, MI (US); Steve Hurite, Taylor, MI (US)

(73) Assignee: Michigan Industrial Trim, Taylor, MI (US)

( * ) Notice: Subject to any disclaimer, the term of this patent is extended or adjusted under 35 U.S.C. 154(b) by 43 days.

(21) Appl. No.: 10/763,125

(22) Filed: Jan. 22, 2004

(65) Prior Publication Data

US 2005/0160956 A1    Jul. 28, 2005

(51) Int. Cl.
*D05B 23/00* (2006.01)

(52) U.S. Cl. .............................. 112/475.08; 112/470.27

(58) Field of Classification Search ........... 112/475.08, 112/475.01, 470.27, 307, 441, 28; 101/1.01, 101/483; 428/904; 83/16; 297/452.21, 297/452.29, 452.38, 452.48
See application file for complete search history.

(56) References Cited

U.S. PATENT DOCUMENTS

| | | | | |
|---|---|---|---|---|
| 2,250,768 A | * | 7/1941 | Kennedy et al. | 112/470.27 |
| 3,703,730 A | * | 11/1972 | Miller | 2/272 |
| 4,065,334 A | * | 12/1977 | Clay | 156/68 |
| 4,287,246 A | * | 9/1981 | Thornton et al. | 428/113 |
| 5,042,338 A | * | 8/1991 | Gerber | 83/34 |
| 5,326,150 A | * | 7/1994 | Robinson et al. | 297/218.2 |

\* cited by examiner

*Primary Examiner*—Ismael Izaguirre
(74) *Attorney, Agent, or Firm*—Harness, Dickey & Pierce, P.L.C.

(57) ABSTRACT

A method is provided for upholstering an automotive interior component such as a seat or door panel. According to the method, a single piece of fabric is provided with a pattern that includes an interior portion and a pair of integral outboard bolsters. In a preferred embodiment, the interior portion is printed with a design that visually distinguishes the interior portion from the bolsters. The fabric is then sewn along pre-selected areas to form pinch seams and side panels may be joined to the pattern. Printing and sewing the pattern in this manner causes the resulting cover to appear as if it were made from multiple pieces of discrete fabric. However, by using the single piece of printed and sewn fabric, the need for multiple rolls of material, laborious pattern cutting, and excess scrap are eliminated.

14 Claims, 7 Drawing Sheets

METHOD OF UPHOLSTERING AN AUTOMOTIVE SEAT

FIELD OF THE INVENTION

The present invention relates to upholstering processes and more particularly to a method of upholstering an automotive seat using a one piece cover preferably including a pre-printed area.

BACKGROUND OF THE INVENTION

Automotive manufacturers upholster many components in the interior of automotive vehicles. For example, upholstering is commonly used to cover automotive seats, interior door panels, center arm rests, and cargo compartments. Many manufacturers prefer to include upholstery having a sculpted or contoured shape. For example, most automotive seat backs and seat bottoms include an interior or center portion bordered on each side by raised bolsters. This provide lateral support for the seat occupant.

Many manufacturers also prefer to include upholstery with a two-toned or varied appearance. That is, many manufactures prefer to provide seats and door panels having a patterned fabric in some sections, such as the interior of the seat back and the seat bottom, and a solid fabric in other sections, such as the outboard bolsters of the seat back and seat bottom. Such patterning provides a distinct look to the automotive interior.

To upholster automotive seats using conventional techniques, multiple fabric panels are cut from bulk fabric rolls and are sewn together to form a cover. For example, a conventional seat bottom cover is made with separate panels for the interior, both bolsters, the front face, and the two side faces. In this case, multiple panels must be cut from a fabric roll to provide the material required to cover a seat.

If a two-toned look is desired, a first fabric roll is required to provide material for the panels of the first or patterned portion of the cover (i.e., the interior) while a second fabric roll is required to provide material for the panels of the second or solid portion of the cover (i.e., the bolsters). Multiple panels are required to be cut out since each portion of the cover originates from a separate fabric roll. The discrete fabric panels must then be sewn together to form the cover.

While the above conventional technique is widely employed, there is room for improvement in the art. For example, the conventional technique requires numerous fabric panels to be individually cut from bulk rolls. Also, a two toned cover requires multiple rolls of different appearing material to be purchased, shipped and stored. This requires great inventory and labor expense, as well as excess scrap, all at increased costs.

In view of the foregoing, it would be desirable to provide a one piece cover for upholstering an automotive interior component such as a seat or door panel. Advantageously, by providing a one piece pattern, many of the panels required to be cut from bulk rolls in the conventional process can be eliminated. Further, a printing process can be used to dye a preselected area of the cover pattern with a design which, when the cover is placed in use, resides along a pre-selected portion of the component to be covered such as the interior of the seat back and seat bottom. The remaining portions of the cover pattern may be left un-dyed so that other portions of the component, such as the outboard bolsters of the seat back and seat bottom, are covered with fabric having a different appearance (i.e., non-dyed) from that of the printed section. As such, a two-tone cover is provided without the need for multiple fabric rolls and numerous panel cuts.

SUMMARY OF THE INVENTION

The above and other objects are provided by a method of covering a component with a one-piece cover. According to the method, a single piece of fabric is provided with a pattern that includes an interior and a pair of bolsters integrally connected to one another. For a seat bottom, the pattern may also include a front face and a kick panel integrally connected to the interior. For a seat back, the pattern may also include a top face between the front and back interiors.

In a preferred embodiment of the present invention, a printing process is used to dye a pre-selected area of the cover pattern (i.e., the front interior) with a design that visually distinguishes that area from the remainder of the fabric. After cutting the pattern from the fabric roll, a pair of side faces are joined to the outboard edges of the bolster areas and to the front face. Also, pinch seams and decorative seams are made. This converts the pattern into a cover.

In accordance with the above technique, the completed cover has the appearance of being made from multiple discrete panels. However, by using the single piece cover pattern of the present invention, the need for multiple panel cuts and multiple rolls of material, as well as the excess scrap associated therewith are eliminated. By dying the selected area of the one-piece pattern, a two-toned cover can be provided.

In another embodiment of the present invention, the method includes providing a cover pattern on a piece of bulk fabric. The cover pattern includes an interior portion continuous with a pair of bolsters. A portion of the cover pattern such as the interior portion is then printed with a pre-selected design and the cover pattern is cut to a desired shape. The cover pattern is then sewn along pre-selected areas and joined with side panels to form a cover and the cover is placed over a vehicle component.

In one preferred embodiment of the present invention, the printed area is provided with a laser jet printing technique. In a second preferred embodiment of the present invention, the cover takes the shape required for covering an automotive seat back or seat bottom. In a third preferred embodiment of the present invention, the cover takes the shape required for covering an automotive door panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention is directed towards a method of upholstering an automotive interior component, such as a seat or a door panel. According to the method, a one piece cover pattern is sewn to yield the appearance of multiple pieces of material sewn together. Advantageously, the method of the present invention eliminates the need for multiple fabric panels to be cut from bulk fabric. In a preferred embodiment, the present invention employs a printing technique to visually distinguish different areas of the cover from one another. This eliminates much of the inventory, labor and scrap required with convention techniques.

Figure 1:
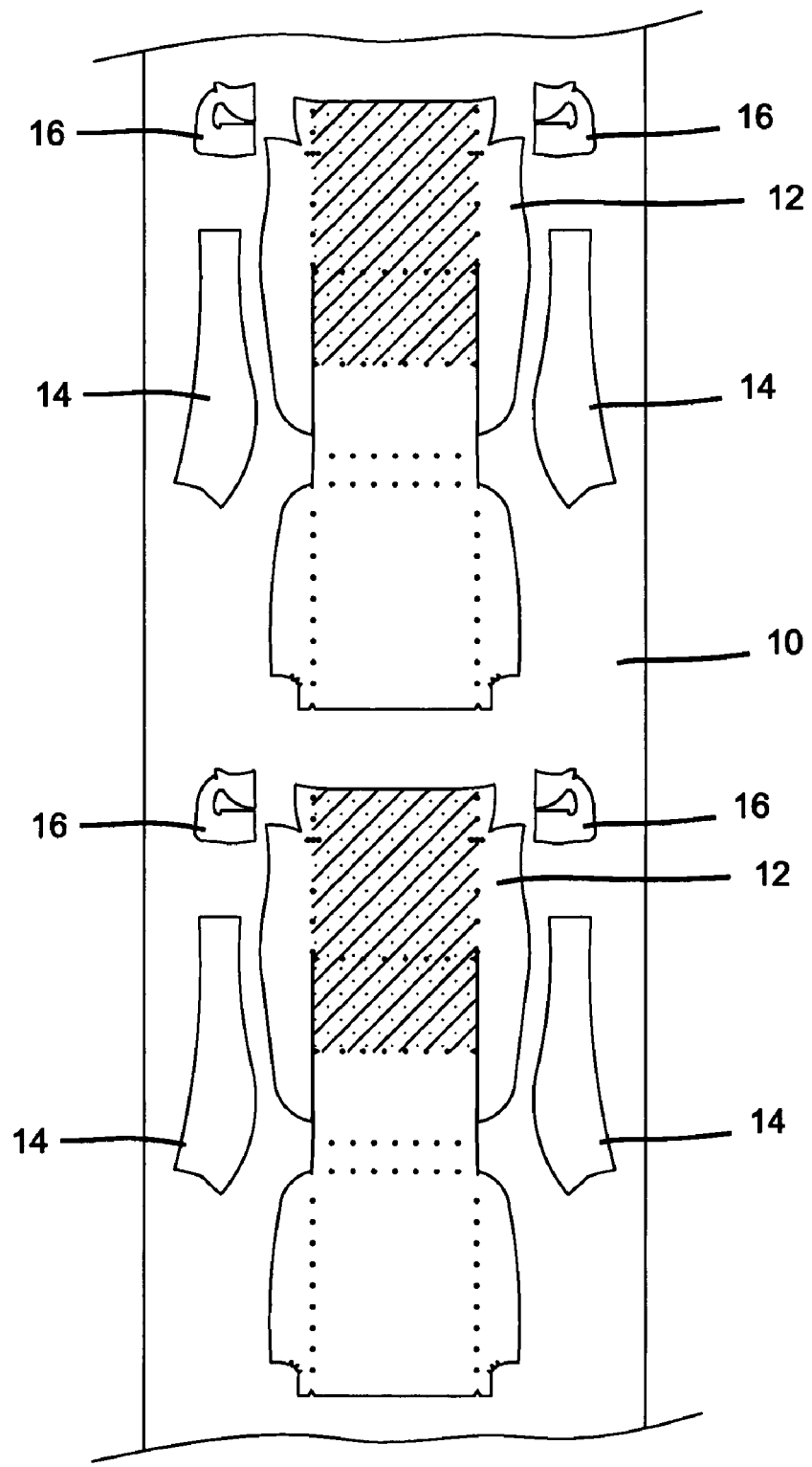
FIG. 1 is a plan view of a fabric roll having a plurality of cover patterns according to a first embodiment of the present invention thereon.

Turning now to the drawings, FIG. 1 illustrates a bulk fabric roll 10 for use in accordance with the teachings of the present invention. The fabric roll 10 includes a pre-selected length of material suitable for use in an automotive environment. For example, the fabric should be of the type commonly employed in automotive interiors and in particular for covering automotive seats and door panels.

The fabric roll 10 includes a plurality of spaced apart and linearly arranged one-piece upholstery or cover patterns 12 formed thereon. The fabric roll 10 also includes a pair of symmetrical side face panels 14 and a pair of symmetrical hinge panels 16. The side face panels 14 and hinge panels 16 will ultimately be joined to the cover pattern 12 to convert the pattern 12 into a seat back cover.

Figure 2:
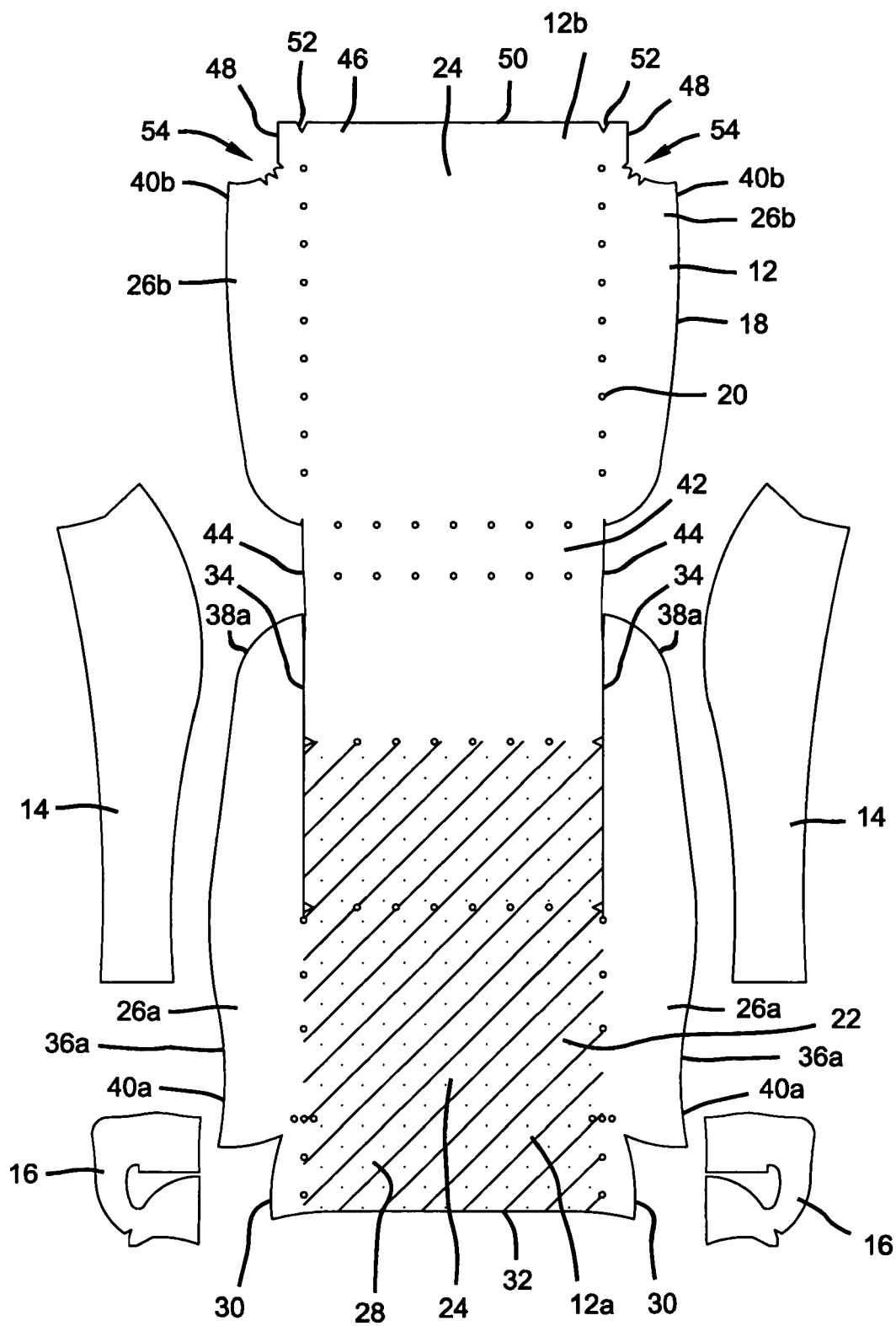
FIG. 2 is a plan view of one of the cover patterns of the first embodiment from FIG. 1.

Turning to FIG. 2, each pattern 12 includes a border outline 18, pinch seam lines 20, and a pre-selected design printing area 22. Since the cover pattern 12 is intended to provide a seat back cover, the cover pattern 12 includes a front 12a and a back 12b. In this case, only the front 12a is provided with the design printing area 22. Other sewing indicia may also be provided to communicate to an upholsterer the location of decorative and join seams and the like.

Each pattern 12 includes an interior area 24 interposed between a pair of symmetrical outboard bolsters 26. As is common in automotive seating arrangements, the bolsters 26 will ultimately be slightly raised relative to the interior area 24 along the front 12a to provide lateral support to a seat occupant. The delineation between the interior area 24 and the outboard bolsters 26 is somewhat obscure in the flat arrangement of the roll 10 shown in FIG. 2 but is generally provided by the pinch seam lines 20. After sewing the pinch seam lines 20 (described below), the interior area 24 abuts the outboard bolsters 26.

The front 12a includes a bottom face 28a extending continuously from the interior area 24. The bottom face 28a includes slightly convex outboard edges 30 and a slightly concave terminal edge 32. The front 12a also includes bolsters 26a extending continuously from the interior area 24. The bolsters 26a are separated from a substantial part of the interior area 24 by splits 34. An outer edge 36a of the bolsters 26a opposite the splits 34 undulates from a shoulder portion 38a to a hip portion 40a.

The front 12a connects to the back 12b by a top face 42. The top face 42 is intended to extend over the area of the seat back commonly provided with a head rest. The outboard edges 44 of the top face 42 will ultimately be joined to the side face panels 14. The side face panels 14 will also be joined between the bolsters 26a and the bolsters 26b. The hinge panels 16 will also be joined between the lower hip portions 40a and 40b to complete the cover.

The back 12b also includes a bottom face 46. The bottom face 46 is generally rectangular shaped and includes substantially parallel outboard edges 48 and a terminal edge 50. A pair of triangular cuts 52 are provided in the terminal edge 50. Similarly, triangular cuts 54 are provided in the arcuate transitions between the bottom face 46 and the bolsters 26b.

Figure 3:
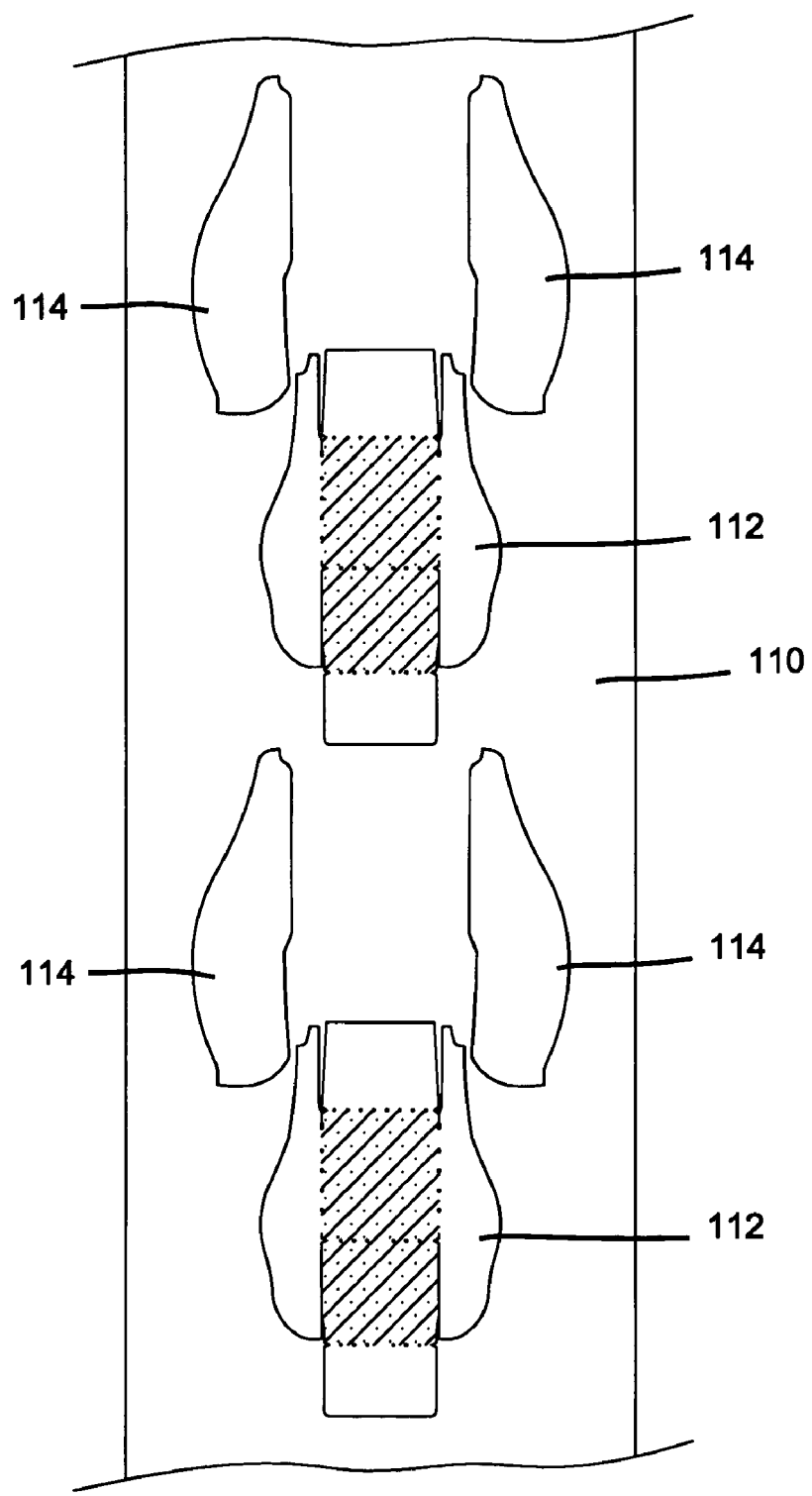
FIG. 3 is a plan view of a fabric roll having a plurality of cover patterns according to a second embodiment of the present invention thereon.

FIG. 3 illustrates a second embodiment of the present invention. In this embodiment, a fabric roll 110 is provided with a plurality of spaced apart and linearly arranged one-piece upholstery or cover patterns 112 formed thereon. The fabric roll 110 also includes a pair of symmetrical side face panels 114. The side face panels 114 will ultimately be joined to the cover pattern 112 to convert the pattern 112 into a seat bottom cover.

Figure 4:
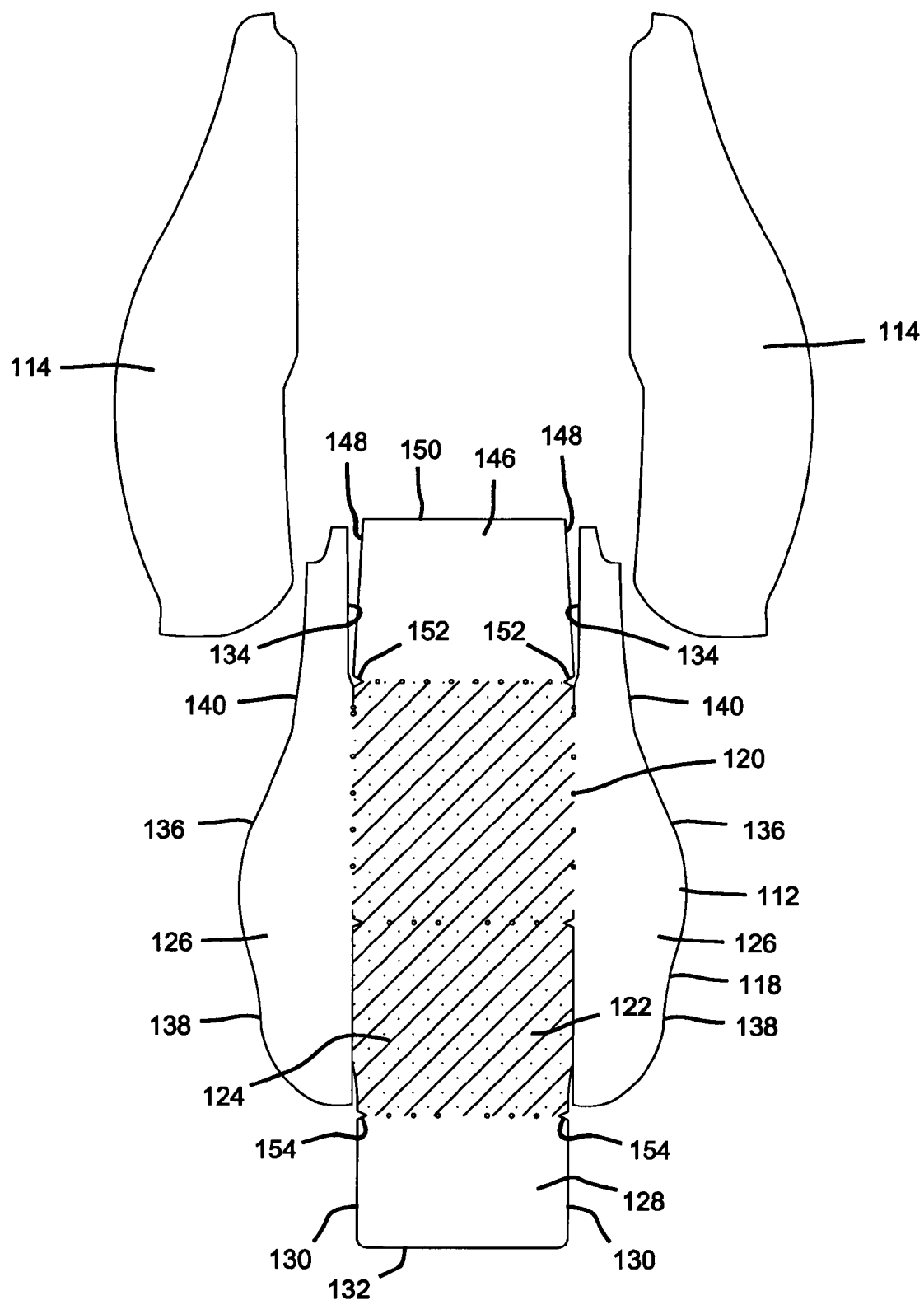
FIG. 4 is a plan view of one of the cover patterns of the second embodiment from FIG. 3.

Turning to FIG. 4, each pattern 112 includes a border outline 118, pinch seam lines 120, and a pre-selected design printing area 122. Other sewing indicia may also be provided to communicate to an upholsterer the location of decorative and join seams and the like. Each pattern 112 includes an interior area 124 interposed between a pair of symmetrical outboard bolsters 126. As is common in automotive seating arrangements, the bolsters 126 will ultimately be slightly raised relative to the interior area 124 to provide lateral support to a seat occupant. The delineation between the interior area 124 and the outboard bolsters 126 is generally provided by the pinch seam lines 120. After sewing the pinch seam lines 120 (described below), the interior area 124 abuts the outboard bolsters 126.

The cover pattern 112 includes a front face 128 extending continuously from the interior area 124. The front face 128 includes slightly convergent outboard edges 130 and a substantially straight terminal edge 132. The cover pattern 112 also includes bolsters 126 extending continuously from the interior area 124. The bolsters 126 are separated from a substantial part of the interior area 124 by splits 134. An outer edge 136 of the bolsters 126 opposite the splits 134 undulates from a knee portion 138 to a hip portion 140.

The cover pattern 112 also includes a kick panel 146. The kick panel 146 is generally rectangular shaped but includes slightly convergent outboard edges 148 and a substantially straight terminal edge 150. A pair of trapezoidal cuts 152 are provided between the kick panel 146 and the interior 124. Similarly, triangular cuts 154 are provided between the front face 128 and the interior area 124.

The outer edges 136 of bolsters 126 will ultimately be joined to the side face panels 114. The front face 128 and kick panel 146 will also be joined to the side face panels 114. As such, the cover pattern 112 is converted into a cover.

Referring now to both FIGS. 2 and 4, a pre-selected portion in the form of the design printing area 22/122 of each pattern 12/112 is dyed so as to include a pattern, design, color or the like which distinguishes that area from the remaining portions of the pattern 12/112. For example, the cover patterns 12/112 include design printing areas 22/122 of interior areas 24/124 having a first or patterned appearance and outboard bolsters 26/126 having a second or solid appearance. Although the outboard bolsters 26/126 are illustrated as solids and the interior areas 24/124 are illustrated with a design, one skilled in the art will appreciate that any two (or more) appearances may be provided including different colors, patterns, designs, etc.

The design printing areas 22/122 of interior areas 24/124 are preferably dyed with a design using a laser jet printing technique. Such a technique places the desired design extremely accurately within the desired area. For example, exactly abutting the pinch seam lines 20/120 separating the interior areas 24/124 from adjacent face panels such as the bottom face 28, top face 42, bottom face 46, front face 128 and kick panel 146. As such, great control of the dyed region of the design printing area 22/122 of the cover pattern 12/112 is provided. This ensures that only the desired region is dyed which reduces or eliminates mistakes and associate scrap. Alternatively, other printing techniques, such as silk screening and ink jet printing, may be used.

After printing the desired designs to the patterns 12/112, the patterns 12/112 are cut to the desired shape from the bulk fabric rolls 10/110. For example, each pattern 12/112 is cut along the outside border 18/118 to be ready for sewing.

Figure 5:
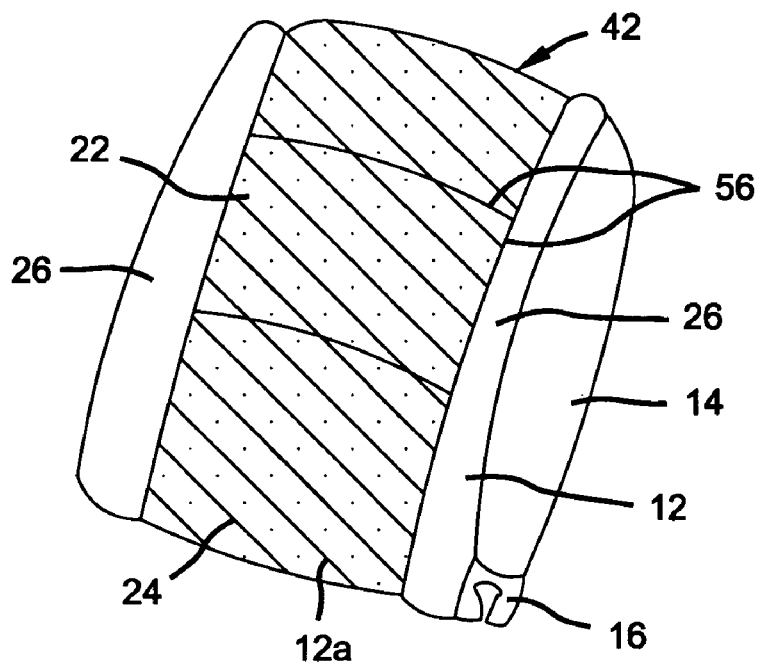
FIG. 5 is a perspective view of the cover of FIG. 2 after it is sewn with select pinch and decorative seams and joined to side and hinge panels.

Turning now to FIG. 5, to convert the pattern 12 into a cover, the pattern 12 is folded about the top face 42 and joined to side panels 14 and hinge panels 16. Decorative or joining seams may be used as desired. Pinch seams 56 are also created by stitching along pinch seam lines 20 (see FIG. 2). Such join/decorative seams and pinch seams give the cover the desired end shape. As can be seen, after sewing, the interior area 24 of the front 12a includes a design visually distinguishing it from the bolsters 26. In combination, the design printing area 22 on the interior area 24, non-printed bolsters 26 and seams 56 give the cover the appearance of having separate pieces of fabric for the interior area 24 and the outboard bolsters 26. However, the need for separate pieces of material is eliminated by using the method of the present invention.

Figure 6:
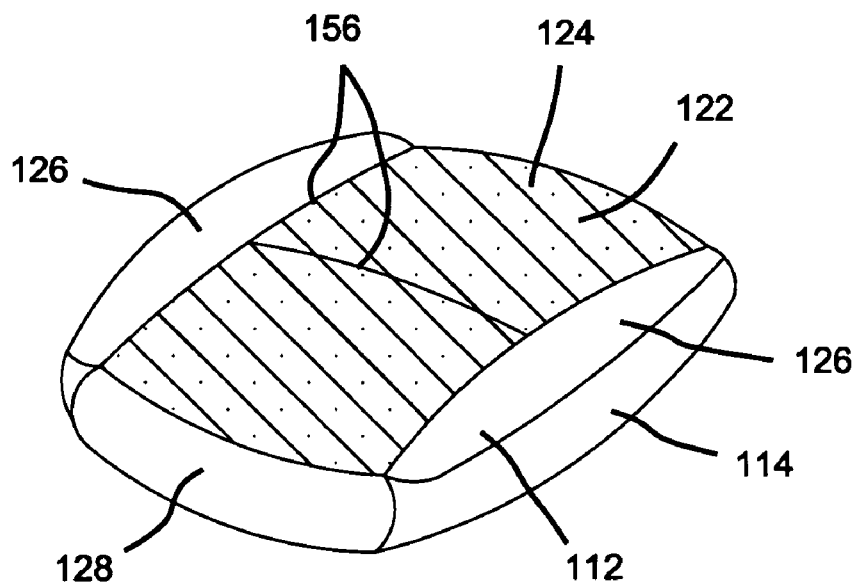
FIG. 6 is a perspective view of the cover of FIG. 4 after it is sewn with select pinch and decorative seams and joined to side face panels.

Turning now to FIG. 6, to convert the pattern 112 into a cover, the bolsters 126 are joined to side panels 114. The front face 128 and kick panel 146 (see FIG. 4) are also joined to the side panels 114. Decorative or joining seams may be used as desired. Pinch seams 156 are also created by stitching along pinch seam lines 120 (see FIG. 4). Such join/decorative seams and pinch seams give the cover the desired end shape. As can be seen, after sewing, the interior portion 124 includes a design visually distinguishing it from the bolsters 126. In combination, the design printing area 122 of the interior area 124, non-printed bolsters 126 and seams 156 give the cover the appearance of having separate pieces of fabric for the interior portion 124 and the outboard bolsters 126. However, the need for separate pieces of material is eliminated by using the method of the present invention.

Figure 7:
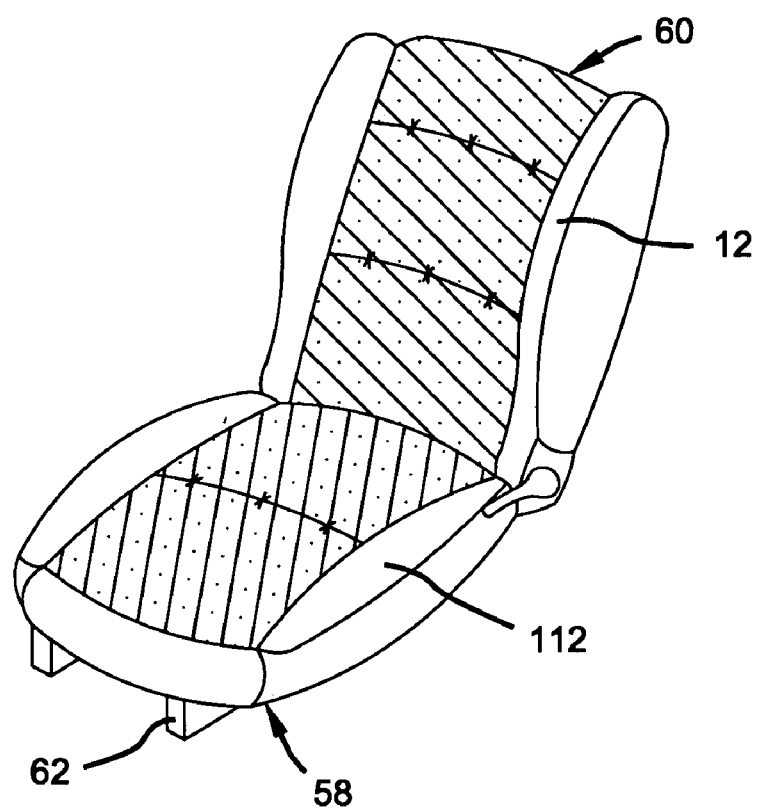
FIG. 7 is a perspective view of a seat incorporating the covers of FIGS. 5 and 6.

Turning to FIG. 7, after sewing the cover patterns 12/112 into their final shapes, the resulting covers are secured over the seat bottom 58 and seat back 60 of seat frame assembly 62. The foam of the seat frame assembly 62 fills the interior volume of the covers causing them to take on the desired end shape. In the embodiment illustrated, the covers also provide a two-toned appearance.

Figure 8:
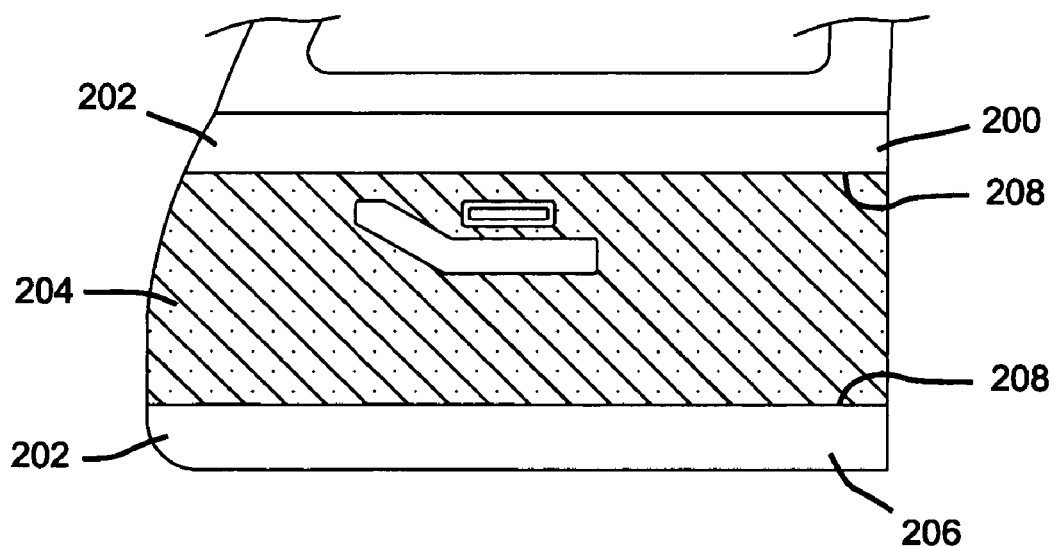
FIG. 8 is a front view of a door panel incorporating the teachings of the present invention.

While the present invention has been described so far with reference to an automotive seat, the present invention is not so limited. For example, any interior component desired to have a fabric covering can be upholstered using the teachings of the present invention. For example, FIG. 8 illustrates an interior door panel 200 incorporating the teachings of the present invention. The door panel 200 includes first sections 202 (i.e., bolsters) having a first appearance and a second section 204 (i.e., the interior portion) having a second appearance. Rather than using three distinct pieces of material for the sections 202 and section 204 as conventionally required, the present invention allows one continuous piece of fabric 206 to be employed after a select portion thereof (corresponding to the interior section 204) has been subjected to dying. Thereafter, pinch seams 208 are formed to delineate bolster sections 202 from interior section 204.

Although the first sections 202 are shown to include the same solid design, it should be appreciated that more than two designs can be provided within any cover. This is accomplished by dying distinct designs to a plurality of different areas of the pattern. Pinch seaming between the designs helps yield the appearance that multiple pieces of material have been sewn together.

Figure 9:
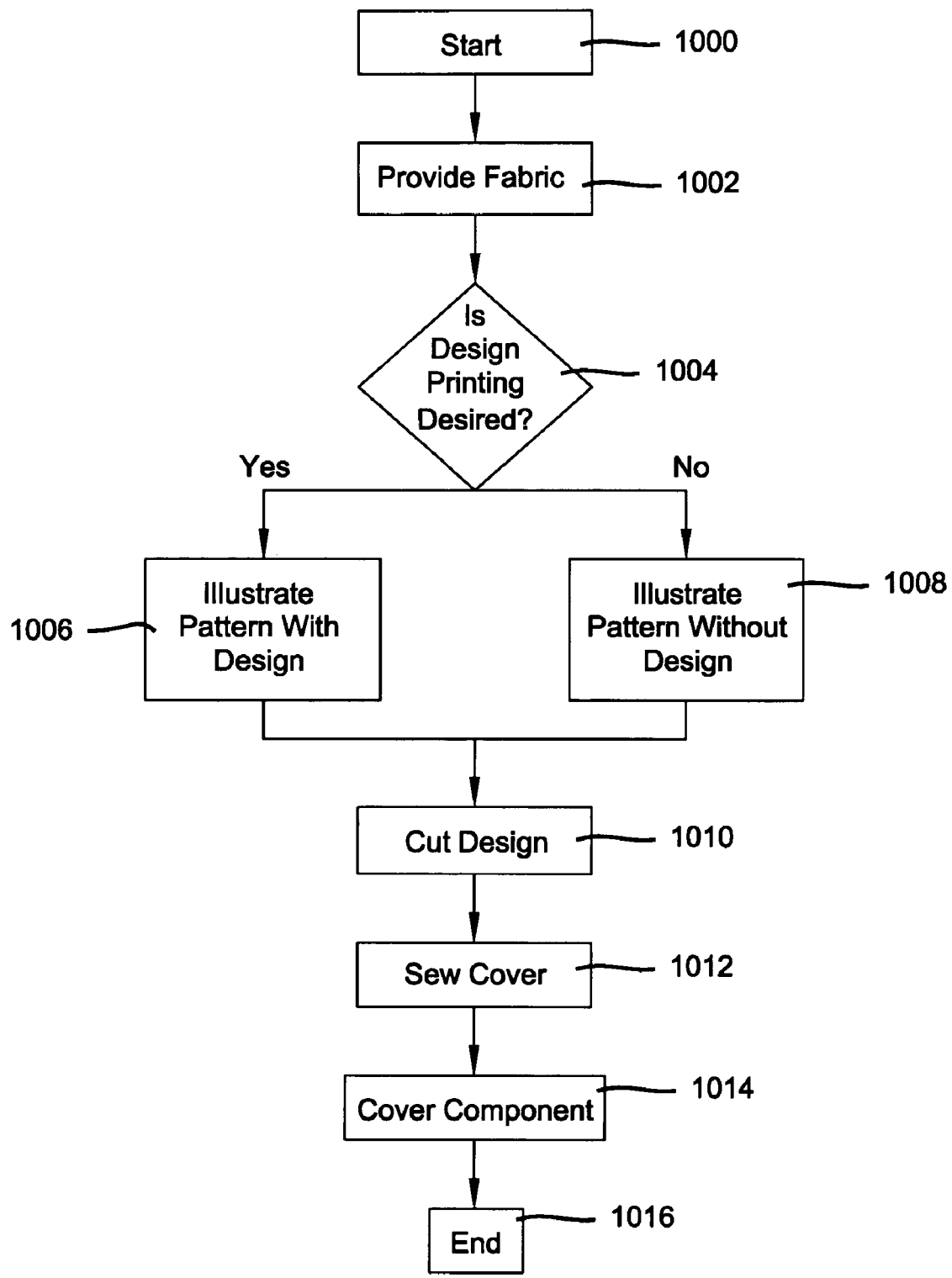
FIG. 9 is a flow chart depicting a method of forming the upholstery cover of the present invention.

Turning now to FIG. 9, a flow chart depicting the method of the present invention is provided. The methodology starts in block 1000 and continues to block 1002. In block 1002, a piece of bulk fabric is provided. Although not necessarily required, the fabric piece is preferably a drawn out portion of a large fabric roll.

From block 1002, the methodology continues to block 1004. In block 1004, the methodology determines whether the pattern for the cover includes a design feature or not. If so, the methodology advances to block 1006. In block 1006, the cover pattern is provided on the bulk fabric. The pattern includes the border outline of the pattern, pinch seam lines, and design printing. The design may be of any nature including solid colors, geometric shapes, floral prints, words, letters, numbers and the like so long as the printed design visually distinguishes the design printing areas of the pattern from the non-printed areas of the pattern. Although other techniques may be available, it is presently preferred to print the design with a laser jet printing process. Although not required, it is preferred to form a plurality of spaced apart patterns along a single continuous piece of fabric to increase efficiency. From block 1006, the methodology continues to block 1010.

If no design feature is desired in block 1004, the methodology advances to block 1008. In block 1008, the cover pattern is provided on the bulk fabric. The pattern includes the border outline of the pattern and pinch seam lines but no design printing. As with the above example, it is preferred to form a plurality of spaced apart patterns along a single continuous piece of fabric to increase efficiency. From block 1008, the methodology continues to block 1010.

In block 1010, the pattern is cut to a desired shape from the bulk fabric roll. Typically, the pattern will be cut along the outline border lines formed in block 1006 or 1008. From block 1010, the methodology continues to block 1012. In block 1012, the cut out pattern is sewn along the edges and pinch seam lines as described above. This converts the pattern into a cover and helps to give the cover the appearance that the cover originated with multiple pieces of material, one for the interior area and others for the bolsters.

From block 1012, the methodology continues to block 1014. In block 1014, the sewn cover is placed over the to-be-covered component such as a vehicle seat or an interior door panel. The padding of the component expands or fills the cover which further delineates the interior area from the bolsters of the cover along the pinch seam lines. From block 1014, the methodology continues to block 1016 and ends.

From the foregoing description it can be appreciated that the present invention provides a method of covering a component with a single continuous piece of fabric. In a preferred embodiment, the fabric cover includes a portion having a printed design thereon. This results in a cover that has the appearance of multiple pieces of fabric sewn together. However, with the present invention, the inventory, labor and scrap associated with such multiple fabric piece designs is eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
    providing a pattern on a piece of bulk fabric, said pattern including an interior portion and a pair of outboard bolsters;
    cutting said pattern to a desired shape from said piece of bulk fabric;
    sewing said pattern along pre-selected areas to delineate said interior portion from said outboard bolsters;
    joining said pattern to side face panels to form a cover; and
    covering a component with said cover.

2. The method of claim 1 further comprising printing a design on a sub-portion of said pattern, said design visually distinguishing said sub-portion of said pattern from a remainder of said pattern.

3. The method of claim 2 wherein said printing step further comprises laser jet printing.

4. The method of claim 1 wherein said pattern further comprises a front face extending from said interior portion in a first direction and a kick panel extending from said interior portion in a second direction opposite said first direction.

5. The method of claim 1 wherein said pattern further comprises a front including said interior portion and said bolsters and a back including a second interior portion and second bolsters, said front and back being connected by a top face.

6. The method of claim 1 wherein said pattern further comprises a pattern of a door panel.

7. The method of claim 1 wherein said sewing step further comprises sewing pinch seams in said pattern between said interior portion and said outboard bolsters.

8. A method comprising:
    providing a piece of fabric with a pattern including an interior portion and a pair of outboard bolsters;
    printing a sub-portion of said pattern with a design visually distinguishing said sub-portion from a remainder of said pattern;
    sewing said fabric along select areas to delineate said interior portion from said bolsters and to convert said pattern into a cover; and
    covering a component with said pattern.

9. The method of claim 8 wherein said printing step further comprises printing said sub-portion by laser jet printing.

10. The method of claim 8 further comprising sewing side panels to said pattern.

11. A method comprising:
    providing a piece of fabric with a pattern including an interior portion and a pair of outboard bolsters;
    sewing said fabric along select areas to delineate said interior portion from said bolsters and to convert said pattern into a cover; and
    covering a component with said pattern;
    wherein said sewing step further comprises forming pinch seams between said interior portion and said pair of outboard bolsters.

12. The method of claim 8 wherein said component further comprises a seat bottom.

13. The method of claim 8 wherein said component further comprises a seat back.

14. A method comprising:
    providing a piece of fabric with a pattern including an interior portion and a pair of outboard bolsters;
    sewing said fabric along select areas to delineate said interior portion from said bolsters and to convert said pattern into a cover; and
    covering a component with said pattern;
    wherein said component further comprises a door panel.

* * * * *